Patented Nov. 11, 1924.

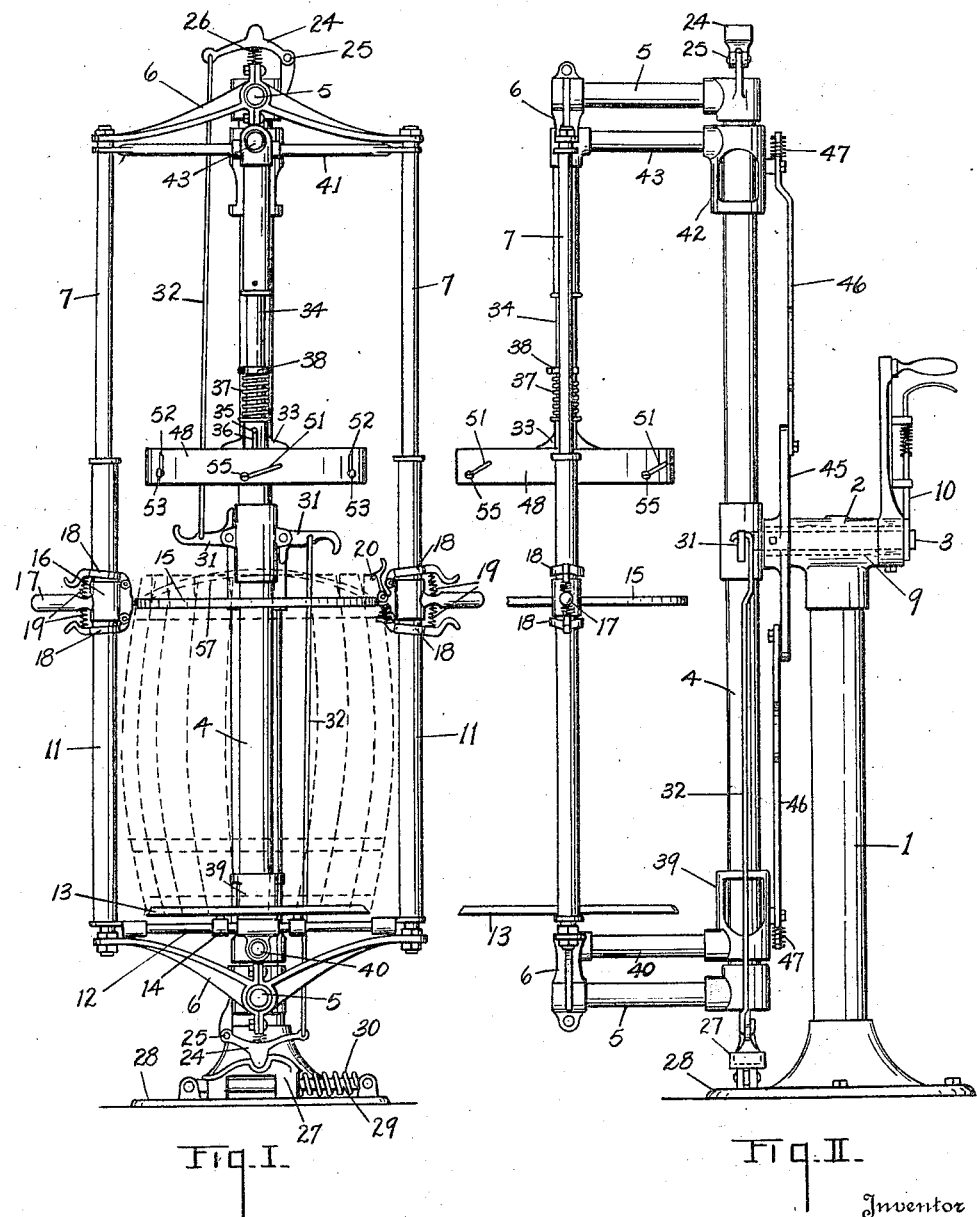

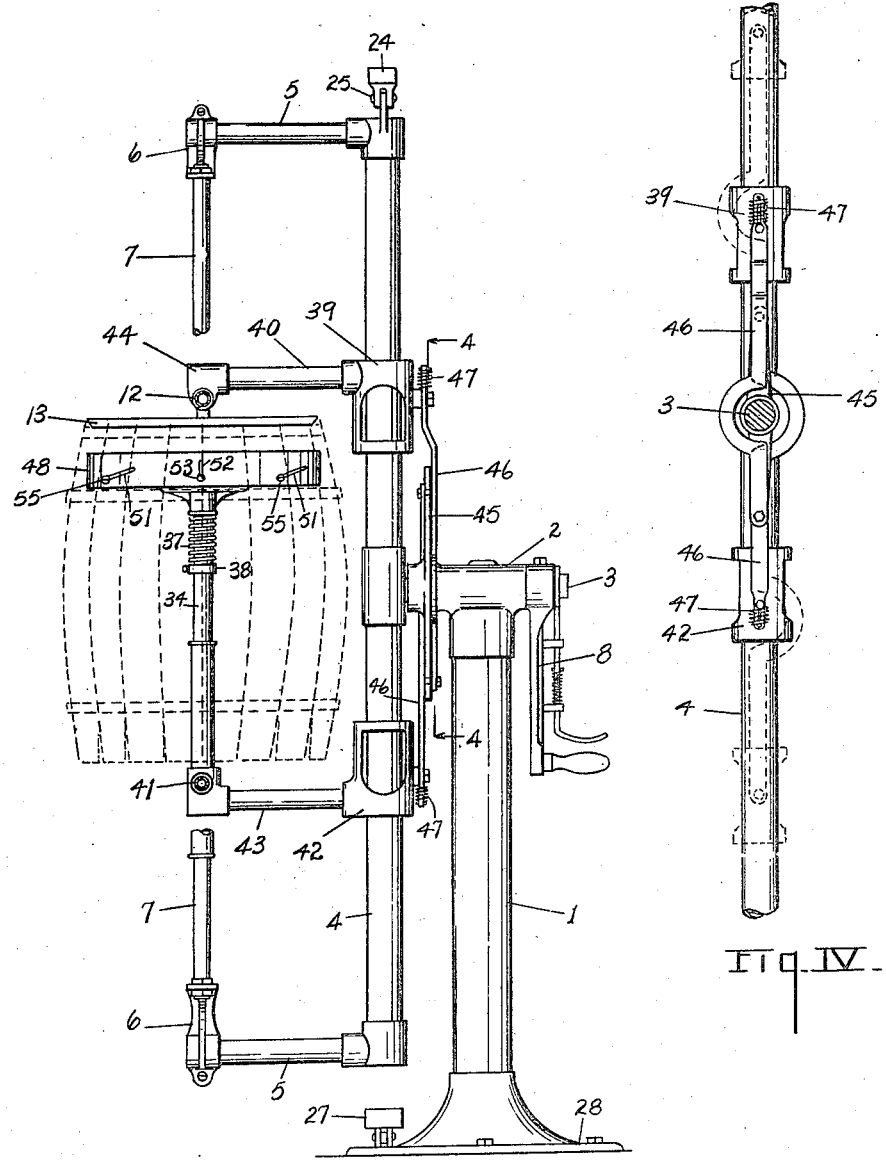

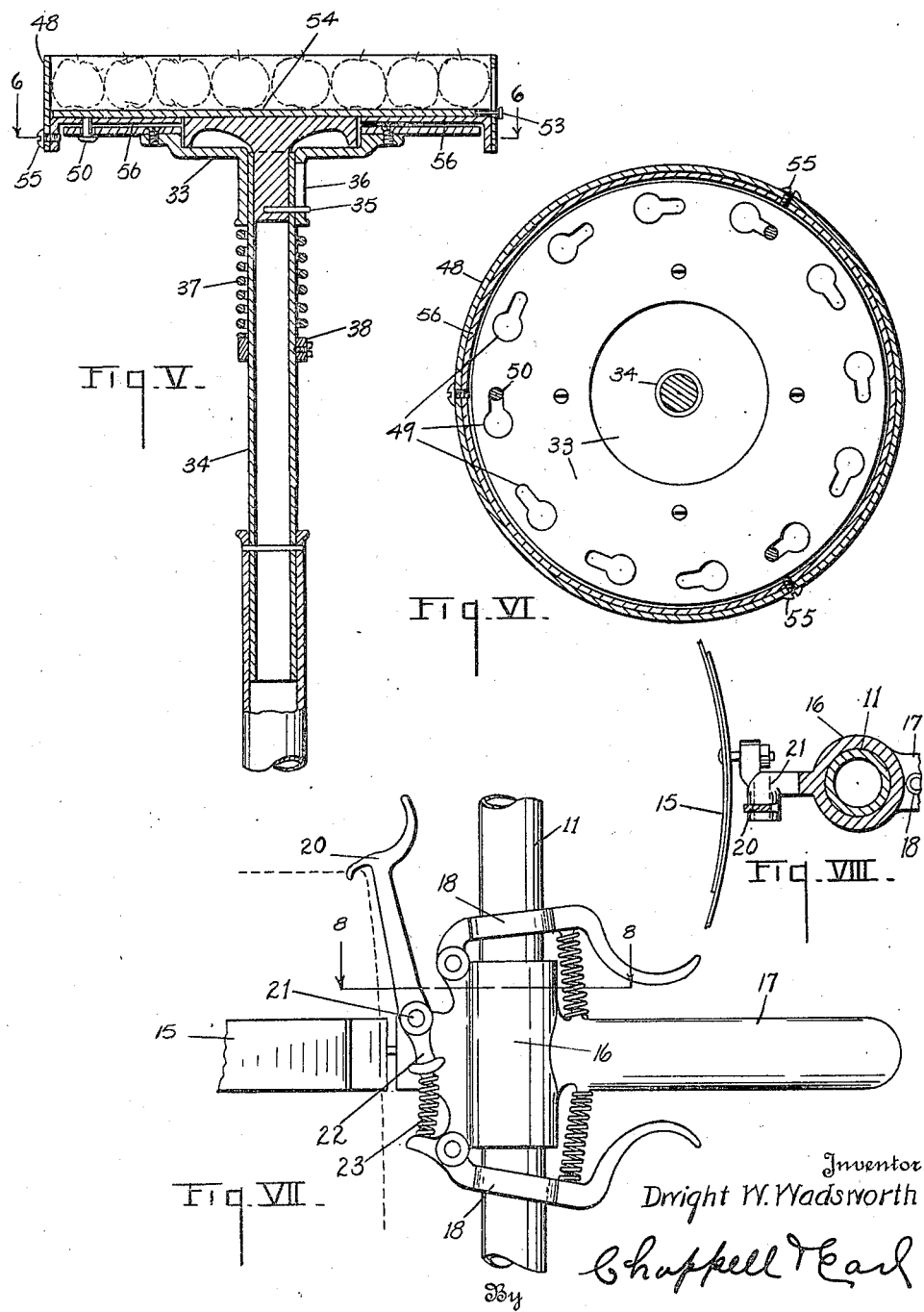

1,514,882

UNITED STATES PATENT OFFICE.

DWIGHT W. WADSWORTH, OF FENNVILLE, MICHIGAN.

FRUIT AND VEGETABLE PACKING MACHINE.

Application filed February 11, 1924. Serial No. 692,199.

*To all whom it may concern:*

Be it known that I, DWIGHT W. WADSWORTH, a citizen of the United States, residing at Fennville, county of Allegan, State of Michigan, have invented certain new and useful Improvements in Fruit and Vegetable Packing Machines, of which the following is a specification.

This invention relates to improvements in fruit and vegetable packing machines.

The main objects of this invention are:

First to provide an improved packing machine by means of which a layer of fruit may be effectively arranged or placed in the end of a barrel.

Second, to provide a machine for use in packing fruit which is very easily and rapidly manipulated.

Third, to provide an improved machine for use in packing fruit and other articles in which a layer is disposed in the end of the barrel, which is not likely to injure the fruit.

Objects pertaining to details and economies of construction and operation of my invention will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this application, in which:

Fig. I is a front elevation of a packing machine embodying the features of my invention, the barrel being indicated by dotted lines to indicate one of the steps of manipulation of the machine.

Fig. II is a side elevation looking from the right of Fig. I.

Fig. III is a detail side elevation showing the machine adjusted to another position, illustrating one of the steps in the use of the machine.

Fig. IV is a detail vertical section on a line corresponding to line 4—4 of Fig. III.

Fig. V is an enlarged detail section of the tray holder showing structural details thereof.

Fig. VI is a horizontal section of the fruit tray holder on a line corresponding to line 6—6 of Fig. V.

Fig. VII is an enlarged detail side elevation of parts of the barrel holding mechanism.

Fig. VIII is a detail section on a line corresponding to line 8—8 of Fig. VII.

In the drawing the sectional views are taken looking in the direction of the little arrows at the ends of the section lines and similar numerals of reference indicate similar parts throughout the several views.

Referring to the drawing I provide a pedestal 1 having a bearing 2 at its upper end for the spindle 3 of the main frame of the machine which is mounted for rotative movement.

This main frame comprises the upright supporting bar 4, preferably a piece of tubing, having the forwardly projecting arms 5 at its ends. On the forward ends of these arms are mounted the cross pieces 6 carrying the slide rods 7. These parts are connected to form a rigid rotatable frame which is controlled by the crank 8. This crank is secured to a sleeve 9 within the bearing 2 and detachably connected to the spindle 3 by means of the latch 10; the latch being shown in engaging position in Figs. II and III. The purpose of the sleeve 9 will be pointed out later.

The barrel support consists of a pair of sleeves 11 slidably mounted upon the slide rods 7 and carrying at the lower ends a cross rod 12 on which the base 13 is mounted by means of the supporting brackets 14 which pivotally engage the rod 12 so that the barrel supporting base may be tilted on the rod to facilitate the introduction and removal of the barrel. This supporting base is of such diameter as to fit within the chimes of the barrel as indicated in Fig. I.

The barrel is further supported by the loop 15 which is slidably mounted upon the sleeves 11 by means of the slides 16 having handles 17 so that the hoop may be adjusted up and down to engage or release the barrel. The slides are provided with clutch members 18 for adjustably securing them in position, the springs 19 being adapted to urge the clutch members to engaging position.

The hook 20 is mounted on one of the slides 16 to engage over the edge of the barrel, this hook being pivoted at 21 and having an extension 22 engaged by the spring 23 which tends to hold the hook either in its engaging position or disengaged position, the spring in the arm or extension 22 having a toggle action.

The barrel is thus supported so that the frame may be swung to invert the barrel as shown in Fig. III. To support the frame in either position I provide it with a pair of latches 24 which are pivoted at 25 and provided with springs 26 by which they are urged into engagement with the keeper 27, this keeper 27 being mounted on the base 28 of the pedestal 1 and preferably slidably mounted on a rod 29 and yieldingly supported thereon by a coiled spring 30 so that the keeper acts as a shock absorber as the frame is swung to position.

To facilitate disengagement of these latches 24 I provide hand levers 31 which are pivotally mounted on the main bar 4 of the frame and connected to the latches by means of the links 32.

The tray supporting head 33 is mounted for limited sliding movement upon the longitudinally disposed arm 34, the arm being provided with a pin 35 engaging a slot 36 in the head, see Fig. V. A coiled spring 37 is arranged between the inner end of the head 33 and the supporting collar 38 on the arm 34. This arm 34 is carried by the slide 42 which carries a supporting frame consisting of the arm 43 on the slide and the cross or guide arm 41 at the outer end of the arm 43, the cross arm having sliding engagement with the slide rod 7, thus providing a rigid guiding and supporting means for the tray support.

The barrel supporting base 13, is, as I have described, slidably supported by means of the sleeves 11 on the slide rod 7. Its movement is controlled by the slide 39 mounted on the frame bar 4 and carrying an arm 40 connected to the cross bar 12 by means of the coupling 44. The slides 39 and 42 are operated from the crank 8 which, as stated, is mounted on the sleeve 9 shown by dotted lines in Fig. II, which carries crank arms 45 connected to the slides 39 and 42 by means of the links 46. These links have sliding engagement with the slides and are provided with springs 47 to prevent excessive pressure upon the fruit and to compensate for any structural irregularities.

In practice I provide a plurality of fruit trays 48 which are detachably engageable with the head 33, the head being provided with a plurality of key-hole slots 49 adapted to be engaged by the headed studs 50, see Figs. V and VI. The tray has an adjustable rim or side portion with diagonally disposed slots 51 therein and vertical slots 52. These vertical slots are engaged by the pins 53 engaging the bottom 54 while the inclined slots are engaged by the screws 55. The pins 53 engage the bottom 54 which is thus movably supported relative to the rim. Screws 55 engaging the diagonally disposed slots permit adjustment of the rim relative to the bottom member 56 by which the studs 50 are carried, the purpose of this adjustment being to accommodate fruit of different sizes. The machine may be operated as follows:

The fruit, indicated by dotted lines in Fig. V, is arranged within the trays, a plurality of trays being provided, as stated. The barrel is placed within the machine as indicated by dotted lines with the staves released at one end, loosening the hoop as indicated at 57, the base 13 being tiltable to facilitate the placing of the barrel thereon.

The supporting band of ring 15 is raised to permit the barrel being swung to an upright position and then dropped down thereon with the hook 20 engaged, thereby securing the barrel within the frame. The frame is then inverted, after disengaging the latch, by swinging the handle 6 with the latch 10 engaged with the spindle 3. This inverts the barrel above the tray holder, the parts being supported in reversed position by means of the other latch.

A tray of fruit is then arranged upon the head which is then in upright position, the latch 10 disengaged from the spindle 3 and the handle 8 operated to actuate the slides 39 and 42. This moves the barrel and the tray supporting head toward each other to the position shown in Fig. III. As the tray approaches the limit of movement its rim engages the inside of the barrel, thus stopping the movement of the tray but the yielding connection for the head 33 to the arm 34 permits the continued movement of the false bottom until the fruit is carried against the bottom of the barrel, the springs 47 being of such character as to prevent crushing of the fruit.

The latch 10 is then allowed to engage with the spindle 3 and the frame swung back to original position, the latch disengaged, and the crank manipulated to retract the plungers which brings the parts back to the position shown in Fig. I, with the fruit disposed in the bottom of the barrel. Before the barrel is removed from the machine the hook 20 is disengaged and the hoop 15 is forced downward as far as it will go, pushing ahead of it the quarter hoop of the barrel. The hoop 15 is then lifted upward to its former position, leaving the quarter hoop of the barrel in normal position. This operation also facilitates tilting of the hoop 15 because of the reduced diameter of the top end of the barrel resultant from lowering of quarter hoop, which operation brings staves at their upper ends into close relationship one with the other. The barrel is then released by lifting the supporting band 15 and another barrel is put in place.

These operations may be rapidly performed and with a relatively small amount of effort on the part of the operator.

I have illustrated and described my improvements in an embodiment which I have found very practical. I have not attempted to illustrate or describe various adaptations or modifications which I contemplate as I believe the disclosure made will enable the embodiment of my invention as may be desired to meet particular requirements. I have referred to the articles packed as fruit, but it will be understood that vegetables or other articles which it is desired to arrange in order in the end of a barrel or package is contemplated.

Having thus described my invention what I claim as new and desire to secure by Letters Patent is:

1. In a structure of the class described, the combination of a pedestal, a frame comprising a supporting bar provided with a spindle and having forwardly projecting arms at its ends provided with cross pieces, slide rods carried by said cross pieces, a barrel support comprising a slide mounted on said supporting bar and provided with a forwardly projecting arm having a cross piece thereon, sleeves connected to said cross piece and slidable on said slide rods, a base tiltingly mounted on said cross piece, a barrel clamping band, supporting brackets therefor slidably mounted on said sleeves and provided with clutch means whereby they are adjustably secured thereon, said band being pivotally mounted on said brackets and one of said brackets being provided with a hook engageable with the upper edge of a barrel, a tray support comprising a slide mounted on said supporting bar and provided with a forwardly projecting arm having a cross piece thereon slidably engaging said slide rods, a tray supporting head provided with a shaft mounted on said tray support, means for actuating said barrel and tray supports comprising a tubular shaft embracing said spindle of said supporting bar and having crank arms thereon, links connecting said crank arms to said slides, and a crank secured to said tubular shaft and provided with means for detachably securing it to said spindle.

2. In a structure of the class described, the combination of a pedestal, a frame comprising a supporting bar provided with a spindle and having forwardly projecting arms at its ends provided with cross pieces, slide rods carried by said cross pieces, a barrel support comprising a slide mounted on said supporting bar and provided with a forwardly projecting arm having a cross piece thereon, sleeves connected to said cross piece and slidable on said slide rods, a base on said cross piece, a barrel clamping band, supports therefor adjustably mounted on said sleeves, a tray support comprising a slide mounted on said supporting bar and provided with a forwardly projecting arm having a cross piece thereon slidably engaging said slide rods, a tray supporting head provided with a shaft mounted on said tray support, means for actuating said barrel and tray supports comprising a tubular shaft embracing said spindle of said supporting bar and having crank arms thereon, links connecting said crank arms to said slides, and a crank secured to said tubular shaft and provided with means for detachably securing it to said spindle.

3. In a structure of the class described, the combination of a pedestal, a frame comprising a supporting bar provided with a spindle and having forwardly projecting arms at its ends provided with cross pieces, slide rods carried by said cross pieces, a barrel support comprising a slide mounted on said supporting bar and provided with a forwardly projecting arm having a cross piece thereon, sleeves connected to said cross piece and slidable on said slide rods, a base tiltingly mounted on said cross piece, a barrel clamping band, supporting brackets therefor slidably mounted on said sleeves and provided with clutch means whereby they are adjustably secured thereon, said band being pivotally mounted on said brackets and one of said brackets being provided with a hook engageable with the upper edge of a barrel, a tray support comprising a slide mounted on said supporting bar and provided with a forwardly projecting arm having a cross piece thereon slidably engaging said slide rods, a tray supporting head provided with a shaft mounted on said tray support, and means for actuating said barrel and tray supports.

4. In a structure of the class described, the combination of a pedestal, a frame comprising a supporting bar provided with a spindle and having forwardly projecting arms at its ends provided with cross pieces, slide rods carried by said cross pieces, a barrel support comprising a slide mounted on said supporting bar and provided with a forwardly projecting arm having a cross piece thereon, sleeves connected to said cross piece and slidable on said slide rods, a base on said cross piece, a barrel clamping band, supports therefor adjustably mounted on said sleeves, a tray support comprising a slide mounted on said supporting bar and provided with a forwardly projecting arm having a cross piece thereon slidably engaging said slide rods, a tray supporting head provided with a shaft mounted on said tray support, and means for actuating said barrel and tray supports.

5. In a structure of the class described, the combination of a pedestal, a frame comprising a supporting bar provided with a spindle and having forwardly projecting arms at its ends provided with cross pieces, slide rods carried by said cross pieces, a barrel support comprising a slide mounted on said supporting bar and provided with a forwardly projecting arm having a cross piece thereon, sleeves connected to said cross piece and slidable on said slide rods, a base on said cross piece, a barrel clamping band, supports therefor adjustably mounted on said sleeves, a tray support comprising a slide mounted on said supporting bar and provided with a forwardly projecting arm having a cross piece thereon slidably engaging said slide rods, a tray supporting head provided with a shaft mounted on said tray support, means for actuating said barrel and tray supports, stop latches at the ends of said supporting bar, and a coacting keeper with which said stop latches are adapted to engage when said supporting bar is in vertical position, said keeper being yieldingly supported whereby it constitutes a buffer.

6. In a structure of the class described, the combination of a pedestal, a frame comprising a supporting bar privided with a spindle, slide rods carried by said frame, a barrel support comprising a slide mounted on said supporting bar, sleeves connected to said slide and slidable on said slide rods, a base tiltingly mounted on said barrel support, a barrel clamping band, supporting brackets therefor adjustably mounted on said sleeves, said band being pivotally mounted on said brackets, a tray support comprising a slide mounted on said supporting bar, a tray supporting head on said tray support, means for actuating said barrel and tray supports comprising a tubular shaft embracing said spindle of said supporting bar and having crank arms thereon, links connecting said crank arms to said slides, and a crank secured to said tubular shaft and provided with means for detachably securing it to said spindle.

7. In a structure of the class described, the combination of a pedestal, a frame comprising a supporting bar provided with a spindle, slide rods carried by said frame, a barrel support comprising a slide mounted on said supporting bar, sleeves connected to said slide and slidable on said slide rods, a base on said barrel support, a barrel clamping band, supporting brackets therefor adjustably mounted on said sleeves, a tray support comprising a slide mounted on said supporting bar, a tray supporting head on said tray support, means for actuating said barrel and tray supports comprising a tubular shaft embracing said spindle of said supporting bar and having crank arms thereon, links connecting said crank arms to said slides, and a crank secured to said tubular shaft and provided with means for detachably securing it to said spindle.

8. In a structure of the class described, the combination of a pedestal, a frame comprising a supporting bar provided with a spindle, slide rods carried by said frame, a barrel support comprising a slide mounted on said supporting bar, sleeves connected to said slide and slidable on said slide rods, a base tiltingly mounted on said barrel support, a barrel clamping band, supporting brackets therefor adjustably mounted on said sleeves, said band being pivotally mounted on said brackets, a tray support comprising a slide mounted on said supporting bar, a tray supporting head on said tray support, and means for actuating said barrel and tray supports.

9. In a structure of the class described, the combination of a pedestal, a frame comprising a supporting bar provided with a spindle, slide rods carried by said frame, a barrel support comprising a slide mounted on said supporting bar, sleeves connected to said slide and slidable on said slide rods, a base on said barrel support, a barrel clamping band, supporting brackets therefor adjustably mounted on said sleeves, a tray support comprising a slide mounted on said supporting bar, a tray supporting head on said tray support, and means for actuating said barrel and tray supports.

10. In a structure of the class described, the combination of a pedestal, a frame comprising a supporting bar provided with a spindle, slide rods carried by said frame, a barrel support comprising a slide mounted on said supporting bar, sleeves connected to said slide and slidable on said slide rods, a base on said barrel support, a barrel clamping band, supporting brackets therefor adjustably mounted on said sleeves, a tray support comprising a slide mounted on said supporting bar, a tray supporting head on said tray support, means for actuating said barrel and tray supports, stop latches on said frame, and a coacting keeper with which said stop latches are adapted to engage when said frame is in vertical position.

11. In a structure of the class described, the combination of a pedestal, a frame rotatably mounted on said pedestal, parallel slide rods on said frame, a barrel support slidably mounted on said frame and provided with a cross piece, sleeves connected to said cross piece and slidable on said slide rods, a supporting base tiltably mounted on said cross piece, a barrel clamping band, supporting brackets therefor adjustably mounted on said sleeves, a tray support slidable on said frame, means for actuating said barrel and tray supports comprising a shaft having crank arms thereon, links connecting said crank arms to said supports, said links being provided with yielding connections to said supports, and means common to both for rotating said frame and actuating said shaft.

12. In a structure of the class described, the combination of a pedestal, a frame rotatably mounted on said pedestal, parallel slide rods on said frame, a barrel support slidably mounted on said frame and provided with a cross piece, sleeves connected to said cross piece and slidable on said slide rods, a supporting base tiltably mounted on said cross piece, a barrel clamping band, supporting brackets therefor adjustably mounted on said sleeves, a tray support slidable on said frame, and means for actuating said barrel and tray supports.

13. In a structure of the class described, the combination of a rotatable frame, a barrel support slidably mounted on said frame and comprising a tilting base, a pivotally and adjustably supported barrel clamping band, a tray support slidably mounted on said frame in opposed relation to said barrel support, means for actuating said barrel and tray supports comprising a crank, and operating connections for said crank to said supports whereby the supports are simultaneously moved toward and from each other, said crank being provided with means for detachably connecting it to said frame, whereby the frame may be rotated.

14. In a structure of the class described, the combination of a rotatable frame, a barrel support slidably mounted on said frame, an adjustably supported barrel clamping band, a tray support slidably mounted on said frame in opposed relation to said barrel support, means for actuating said barrel and tray supports comprising a crank, and operating connections for said crank to said supports whereby the supports are simultaneously moved toward and from each other, said crank being provided with means for detachably connecting it to said frame, whereby the frame may be rotated.

15. In a structure of the class described, the combination of a rotatable frame, a barrel support slidably mounted on said frame, an adjustably supported barrel clamping band, a tray support slidably mounted on said frame in opposed relation to said barrel support, means for actuating said barrel and tray supports comprising a crank, operating connections for said crank to said supports whereby the supports are simultaneously moved toward and from each other, said crank being provided with means for detachably connecting it to said frame, whereby the frame may be rotated, and stop means for supporting said frame in its adjusted positions.

16. In a structure of the class described, the combination of a rotatably mounted frame, a barrel support slidably mounted on said frame and having a tilting supporting base, a clamping band mounted for tilting and vertical adjustment, a tray support slidable on said frame in opposed relation to said barrel support, means for actuating said barrel and tray supports comprising a shaft having crank arms thereon, links connecting said crank arms to said supports, said links being provided with yielding connections to said supports, and means common to both for rotating said frame and actuating said shaft.

17. In a structure of the class described, the combination of a rotatably mounted frame, a barrel support slidably mounted on said frame and having a tilting supporting base, a clamping band mounted for tilting and vertical adjustment, a tray support slidable on said frame in opposed relation to said barrel support, means for actuating said barrel and tray supports comprising a shaft having crank arms thereon, links connecting said crank arms to said supports, and means common to both for rotating said frame and actuating said shaft.

18. In a structure of the class described, the combination of a frame provided with a spindle, a barrel support slidably mounted on said frame, a tray support slidably mounted on said frame in opposed relation to said barrel, means for actuating said barrel and tray supports comprising a tubular shaft embracing said spindle and having crank arms thereon, links connecting said crank arms to said supports, a crank on said tubular shaft, and means for detachably connecting said crank to said spindle.

19. In a structure of the class described, the combination of a frame provided with a spindle, a barrel support slidably mounted on said frame, a tray support slidably mounted on said frame in opposed relation to said barrel, means for actuating said barrel and tray supports comprising a tubular shaft embracing said spindle and having crank arms thereon, and link connections for said crank arms to said supports, said connections including spring members.

20. In a structure of the class described, the combination of a frame provided with a spindle, a barrel support slidably mounted on said frame, a tray support slidably mounted on said frame in opposed relation to said barrel, means for actuating said barrel and tray supports comprising a tubular shaft embracing said spindle and having crank arms thereon, and link connections for said crank arms to said supports.

21. In a structure of the class described, the combination of a barrel support comprising a tilting base, and a barrel clamping band mounted for pivotal and vertical adjustment.

22. In a structure of the class described, the combination of a rotatably mounted frame, a barrel support slidably mounted on said frame, a tray support slidably mounted on said frame in opposed relation to said barrel support, and means for actuating said barrel and tray supports whereby the tray support is introduced to the barrel with the barrel in inverted position and adapted to permit rotation of the frame to bring the barrel to upright position and the retraction of the tray support.

23. In a structure of the class described, the combination of a rotatable frame, a barrel supporting means slidably mounted thereon, a tray supporting means slidably mounted thereon, and means for adjusting said barrel and tray supports to introduce the tray into the barrel when in inverted position and adapted to permit the reversing of the frame and the retracting of the tray support when the barrel is in upright position.

24. In a structure of the class described, the combination of a rotatably mounted frame, a barrel support on said frame, and a tray support slidably mounted on said frame in opposed relation to said barrel support whereby the tray support may be introduced to the barrel with the barrel in inverted position, and the frame rotated and the tray support retracted.

25. In a structure of the class described, the combination of a rotatable frame, a barrel support carried thereby, a tray support slidably mounted on said frame in opposed relation to said barrel support and comprising a tray supporting shaft, a tray supporting head provided with a plurality of annularly disposed key-hole slots, said head being mounted on said shaft for limited longitudinal movement, a spring for yieldingly supporting said head, a demountable tray comprising a bottom member provided with headed studs engageable and disengageable with said key-hole slots by rotative movement of the tray, and a rim adjustably mounted on said bottom, said tray being provided with a false bottom movably supported therein for ejecting the tray contents.

26. In a structure of the class described, the combination of a rotatable frame, a barrel support carried thereby, a tray support slidably mounted on said frame in opposed relation to said barrel support and comprising a tray supporting shaft, a tray supporting head mounted on said shaft for limited longitudinal movement, a spring for yieldingly supporting said head, and a demountable tray, said tray being provided with a false bottom movably supported therein for ejecting the tray contents.

27. In a structure of the class described, the combination of a rotatable frame, a barrel support carried thereby, a tray support slidably mounted on said frame in opposed relation to said barrel support and comprising a tray supporting shaft, a tray supporting head provided with a plurality of annularly disposed key-hole slots, a demountable tray comprising a bottom member provided with headed studs engageable and disengageable with said key-hole slots by rotative movement of the tray, and a rim adjustably mounted on said bottom.

28. In a structure of the class described, the combination of a rotatable frame, a barrel support carried thereby, a tray support slidably mounted on said frame in opposed relation to said barrel support and comprising a tray supporting shaft, a tray supporting head provided with a plurality of annularly disposed key-hole slots, and a demountable tray comprising a bottom member provided with headed studs engageable and disengageable with said key-hole slots by rotative movement of the tray.

29. In a structure of the class described, the combination of a rotatable frame, a barrel support carried thereby, a tray support slidably mounted on said frame in opposed relation to said barrel support and comprising a tray supporting shaft, a tray supporting head mounted on said shaft for limited longitudinal movement thereon, a spring for yieldingly supporting said head, a demountable tray, and a false bottom movably supported therein for ejecting the tray contents.

30. In a structure of the class described, the combination of a rotatable frame, a barrel support carried thereby, a tray support slidably mounted on said frame in opposed relation to said barrel support and comprising a tray supporting shaft, a tray supporting head, and a demountable tray.

In witness whereof, I have hereunto set my hand.

DWIGHT W. WADSWORTH. [L. S.]